Sept. 12, 1950     G. R. KODADEK ET AL     2,521,855
FOOD CRISPER
Filed March 21, 1946

INVENTORS
GEORGE R. KODADEK
JOSEPH M. KODADEK
By Paul, Paul & Moore
ATTORNEYS

Patented Sept. 12, 1950

2,521,855

UNITED STATES PATENT OFFICE 2,521,855

FOOD CRISPER

George R. Kodadek and Joseph M. Kodadek, Minneapolis, Minn.

Application March 21, 1946, Serial No. 656,027

3 Claims. (Cl. 99—339)

This invention, in its broad aspect, relates to an apparatus for crisping, or heating, various food articles such as dried cereals, pretzels, crackers, and the like, which may have lost some or all of their original freshness and crispness as a result of dampness which may be caused by a relatively high humidity.

It is well known that many food articles, such as dried cereals, crackers, pretzels, and the like, are more palatable to the taste when served in a crisp and more or less brittle condition. Many such foods have an inherent tendency to absorb moisture, which may be in the form of humidity, whereby they may quickly lose their original freshness and crispness and, as a result, become less palatable to the taste. Such lack of crispness may be restored by subjecting the uncrisp food articles to heat, which will absorb or dissipate the moisture contained therein and thereby render the food crisp and fresh again.

To the best of our knowledge, no one has heretofore developed a small practical device which may be used as an adjunct to a conventional toaster for crisping food articles which may temporarily have lost their original crispness, and whereby such food articles may be quickly treated to restore them to their normal fresh, crisp condition prior to serving.

An object of the present invention, therefore, is to provide a device which may be used in connection with a conventional toaster, whereby such a toaster may be utilized for quickly crisping dried cereals and other food articles which may require such treatment to render them more palatable for serving.

A further object is to provide a device of the class described comprising a suitable container having one or more openings in its bottom wall, and a suitable perforated food-containing basket being removably mounted in the container, whereby when the device is placed over a source of heat, heated air directed into the container through the openings in the bottom wall thereof will pass upwardly through the perforated basket and between the food particles contained therein, thereby to quickly dissipate any moisture which may have been absorbed by the food and thereby restore the food to its original freshness and crispness.

A further object of the invention is to provide a food crisper comprising a container having an opening in its bottom wall and provided with means whereby the container may be removably supported upon the casing of a toaster with the opening in its bottom wall registering with the usual bread-receiving opening provided in the toaster, and a perforated basket having a suitable handle having means for removably supporting it on the walls of the container with its bottom wall spaced upwardly from the bottom wall of the container, thereby to provide an air-distributing chamber beneath the basket, whereby when the basket is placed in the container with cereal or some other food article supported therein, heated air from the toasting chamber of the toaster may circulate upwardly through the perforations in the basket between the food particles contained therein, thereby to quickly absorb moisture contained in the food and thus restore it to its normal crisp condition.

Other objects of the invention reside in the novel means provided on the container for removably supporting it on a toaster; in the means provided for supporting the perforated basket within the container whereby the walls of the basket are spaced slightly from the walls of the container, thereby to assure free circulation of air from the toasting chamber upwardly through the container and perforated basket; in the provision of such a device which comprises two parts, a container provided with a suitable handle to facilitate moving the container from one place to another, and a perforated basket also having a handle whereby it may readily and conveniently be positioned within the container or be removed therefrom to discharge or dump its contents into a suitable receiving dish after the food has been thoroughly crisped within the basket; and in the provision of such a device which is extremely simple and inexpensive in construction whereby it may be manufactured in quantity production at low cost.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figure 1:
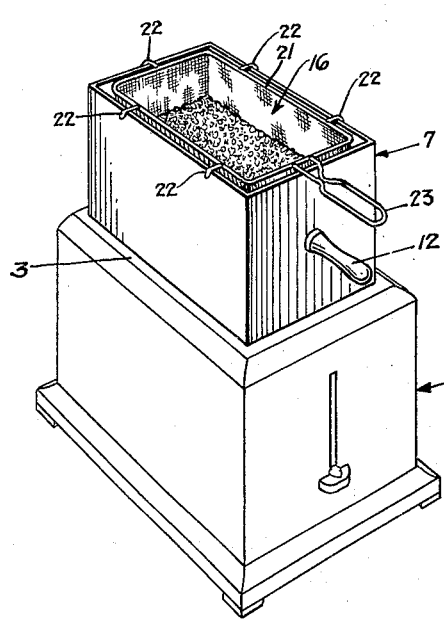
Figure 1 is a perspective view showing our improved crisper in operative position upon a conventional toaster.
Figure 2:
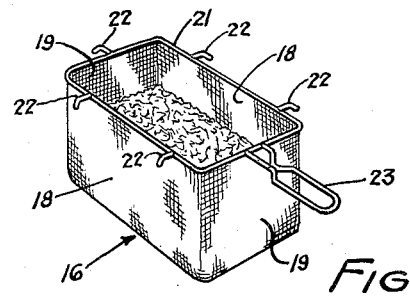
Figure 2 is a perspective view of the food-containing basket removed from the container.

In the selected embodiment of the invention herein disclosed, there is illustrated in Figure 1, for purposes of disclosure, a representation of a conventional two-slice toaster, designated by the numeral 2. The top wall 3 of the toaster casing is shown provided with the usual bread-receiving openings 4, each in communication with a toasting chamber 5 which are heated by the usual heating elements 6, when the toaster is in operation, as is well known.

An important feature of the present invention is to provide a device adapted for use in connection with a conventional toaster whereby such a toaster may be utilized for crisping various food articles which have a tendency to absorb moisture, as, for example, dried cereals, crackers, and many other such articles, which, to be served at their best, must be fresh and crisp.

The device, as clearly illustrated in the drawing, comprises a suitable container, generally designated by the numeral 7, having opposed side walls 8, end walls 9, and a bottom wall 11. A suitable handle 12 is shown secured to one of the end walls of the container whereby it may be conveniently moved about from place to place.

Figure 4:
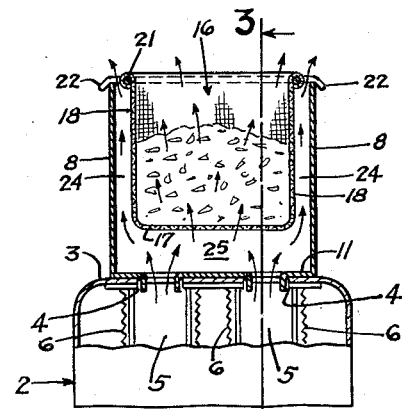
Figure 4 is a cross-sectional view on the line 4—4 of Figure 3.
Figure 3:
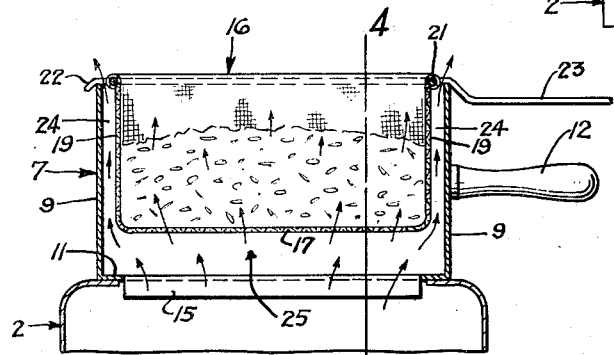
Figure 3 is a vertical sectional view on the line 3—3 of Figure 4 showing the perforated basket positioned within the container and indicating the circulation of heated air upwardly through the container and basket.
Figure 5:
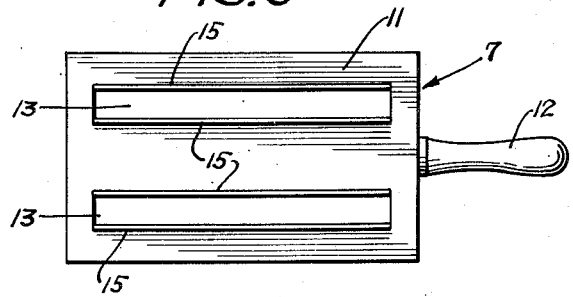
Figure 5 is a bottom view of the container.

The bottom wall 11 of the container 7, as best shown in Figure 5, is provided with one or more elongated openings 13, which openings are so spaced apart as to register with the bread-receiving openings 4 in the top wall of the toaster, when the container is operatively seated on the toaster, as shown in Figures 1, 3 and 4. If the device is to be used in connection with a one-slice toaster, shown in Figure 6, the container bottom is provided with a single slot.

To retain the container 7 in proper position upon the top wall of the toaster, the openings 13 are shown flanked at their opposite sides by depending flanges 15 which are adapted to enter the bread-receiving openings or slots in the top wall of the toaster, as best shown in Figures 3 and 4, thereby to prevent relative movement of the container upon the toaster, when the container is in operative position thereon. The flanges 15 may also be utilized as a means for supporting the container with its bottom wall 11 spaced from a table top or other support, when the container is removed from the toaster.

A suitable basket 16 is removably supported within the container 7 and is adapted to contain the food article to be crisped by the flow of heated air upwardly through the container. The bottom wall 17 of the basket, and preferably its side and end walls 18 and 19, respectively, are perforated to permit heated air to circulate freely therethrough from the toasting chamber, and whereby all of the contents of the basket are subjected to the drying or crisping action of the heated air emanating from the toaster.

The basket 17 is preferably constructed of a suitable wire mesh so as to present as little obstruction as possible to the circulation of air therethrough from the toasting chamber, although it is to be understood that it may be made from suitably perforated sheet metal, if desired.

The basket 16 is supported within the container 7 with its walls spaced from the corresponding walls of the container, and this may be inexpensively accomplished by providing the upper edge of the basket with a suitable reinforcing element 21 having outwardly extending fingers or elements 22 thereon adapted to engage the top edges of the walls of the container 7, as shown in Figures 1, 3 and 4. If desired, other means applicable for the purpose may be utilized in lieu of the elements 22 for holding the basket in proper position within the container 7, without departing from the scope of the invention. The basket 16 has a suitable handle 23, whereby it may be conveniently lifted out of the container or placed therein, as will be understood.

To prevent overheating of the toaster, the basket 16 is so dimensioned that its walls are spaced inwardly from the walls of the container 7, thereby to provide an annular air circulating passage 24 between the walls of the container and the walls of the basket. The bottom wall 17 of the basket is also preferably spaced upwardly from the bottom wall 11 of the container, thereby to provide a hot air-distributing chamber 25 beneath the basket, as best illustrated in Figures 3 and 4.

In use, the container is positioned upon the toaster, as shown in Figures 1, 3 and 4, and the toaster is then turned on in the usual manner to heat the toasting chamber 5. The food article to be crisped is placed in the basket 16, after which the basket is placed in the container, as shown in the drawing. If desired, the basket may be placed within the container before placing the food article therein.

When the loaded basket is in operative position within the container 7, the heated air discharging from the bread-receiving openings or slots 4 in the top wall of the toaster will circulate upwardly through the basket and the food particles contained therein, whereby the heated air will quickly absorb any dampness contained in the food and thereby restore it to its original freshness and crispness. Heated air will also circulate upwardly through the annular air passage 24 provided around the basket, whereby the circulation of heated air from the toasting chambers will not be impeded sufficiently to cause excessive heating of the toaster.

The novel food crisper herein disclosed has been found extremely practical and efficient for crisping such food articles as dry cereals, which have a tendency to quickly lose their original crispness in damp atmosphere, which may frequently be caused by a relatively high humidity.

By mounting the crisper directly upon a conventional toaster, as herein disclosed, the food articles may be quickly crisped at the table just prior to serving, whereby such food articles may always be served at their best.

Figure 6:
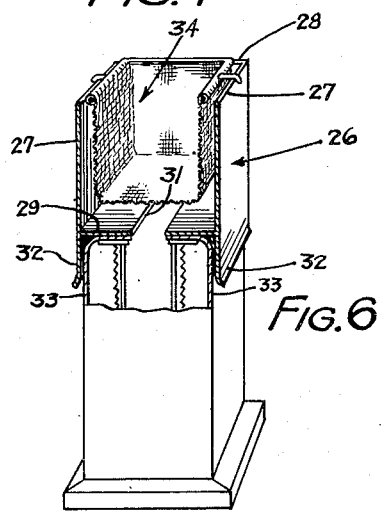
Figure 6 is a view showing a crisper designed for use in connection with a one-slice toaster.

In Figure 6, we have shown a crisper designed for use in connection with a one-slice toaster. As here shown, the crisper 26 comprises opposed side walls 27 and end walls 28 and a bottom wall 29 having an elongated opening 31 therein. To support the container 26 of the crisper upon the toaster, the side walls 27 thereof are shown provided with depending flanges 32 which extend downwardly below the bottom wall of the crisper into engagement with the usual side walls 33 of the toaster housing, as shown. Means, not shown, is also provided for preventing longitudinal movement of the container 16 upon the toaster.

A suitable perforated basket 34 is removably supported within the container 26, similar to the one shown and described with reference to the previous figures.

The operation of the device shown in Figure 6 is substantially the same as the operation of the device shown in the previous figures.

While the device herein disclosed has been designed primarily for use in connection with a toaster, it is to be understood that it may be used in conjunction with various other heating devices, as, for example, gas or electric ranges or small portable electrical heating plates, which may be so constructed that the container 7 (or 26) may be placed thereon, whereby the heated air discharging from the heating plate may circulate upwardly through the container.

It will be apparent to those skilled in the art that we have accomplished at least the principal objects of our invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

What we claim is:

1. The combination with a toaster of the class having a toast receiving slot in its top wall, of a container having an opening in its bottom wall adapted to register with the bread-receiving opening in the toaster whereby heated air may circulate from the toaster through the container, flanges secured to and depending from the bottom wall of the container adapted to be received in the bread receiving opening of the toaster and a perforated food-receiving basket detachably supported within the container with its side and bottom walls spaced from the walls of the chamber to permit heated air to circulate through all of the perforated walls of the basket.

2. The combination with a toaster comprising a casing having a toasting chamber therein and the top wall of said chamber being provided with elongated bread-receiving openings, of a container having elongated openings in its bottom wall flanked at their sides with depending flanges adapted to be received in the bread-receiving openings of the toaster thereby to support the container on the toaster with its bottom openings in registration with the bread-receiving openings in the toaster, and a perforated food-receiving basket removably supported within the container, the perforations in said basket permitting heated air to circulate upwardly through the basket from the toasting chamber, thereby to quickly crisp food articles placed in the basket.

3. The combination with a toaster comprising a casing having a toasting chamber therein and the top wall of said chamber being provided with elongated bread-receiving openings, of a container having elongated openings in its bottom wall flanked at their sides with depending flanges adapted to be received in the bread-receiving openings in the toaster, thereby to support the container on the toaster with its bottom openings in registration with the bread-receiving opening in the toaster, a perforated food-receiving basket removably supported within the container, and means whereby the bottom wall of the basket is spaced upwardly from the bottom wall of the container, thereby to provide a chamber beneath the basket for uniformly distributing the heated air about the basket.

GEORGE R. KODADEK.
JOSEPH M. KODADEK.

REFERENCES CITED

The following references are of record in the file of this patent:

UNITED STATES PATENTS

| Number | Name | Date |
| --- | --- | --- |
| 1,301,286 | Little et al. | Apr. 22, 1919 |
| 1,352,071 | Leeper | Sept. 7, 1920 |
| 1,460,975 | Miller et al. | July 3, 1923 |
| 1,587,023 | Mottlou | June 1, 1926 |
| 1,714,536 | Wooderson | May 28, 1929 |
| 2,382,380 | Buttner | Aug. 14, 1945 |

FOREIGN PATENTS

| Number | Country | Date |
| --- | --- | --- |
| 8,344 | Australia | Jan. 18, 1928 |